(12) United States Patent
Kroell et al.

(10) Patent No.: US 6,273,686 B1
(45) Date of Patent: Aug. 14, 2001

(54) APPARATUS AND METHOD FOR CONTROLLING A RATED SYSTEM PRESSURE

(75) Inventors: Harald Kroell, Laubach; Walter Pitz, Biedenkopf, both of (DE)

(73) Assignee: A. Roemheld GmbH & Co KG, Laubach (DE)

( * ) Notice: Subject to any disclaimer, the term of this patent is extended or adjusted under 35 U.S.C. 154(b) by 0 days.

(21) Appl. No.: 09/494,575

(22) Filed: Jan. 31, 2000

(30) Foreign Application Priority Data

Jan. 29, 1999 (DE) ................................. 199 03 404

(51) Int. Cl.$^7$ ............................. F04B 49/00; F04B 23/00; E03B 7/07; G05D 11/00
(52) U.S. Cl. ..................... 417/307; 417/440; 417/300; 417/63; 417/282; 417/292; 137/557; 137/115.18
(58) Field of Search ................................. 417/307, 440, 417/300, 63, 282, 292; 137/557, 115.18

(56) References Cited

U.S. PATENT DOCUMENTS

| | | | |
|---|---|---|---|
| 3,561,541 | * | 2/1971 | Woelfel ........................... 172/265 |
| 3,739,690 | * | 6/1973 | Cryder ............................. 91/28 |
| 3,865,013 | * | 2/1975 | Mastaj ............................. 91/513 |
| 3,889,340 | * | 6/1975 | Dixon, Jr. ........................ 29/203 DT |
| 3,967,646 | * | 7/1976 | Solie ............................. 137/596.12 |
| 5,634,778 | * | 6/1997 | Liegel et al. .................... 417/313 |

FOREIGN PATENT DOCUMENTS 3232536   3/1984 (DE).

\* cited by examiner

Primary Examiner—Timothy S. Thorpe
Assistant Examiner—Michael K. Gray
(74) Attorney, Agent, or Firm—W. F. Gasse; W. G. Fasse

(57) ABSTRACT

The rated system pressure in a pressure control system is adjusted through a pressure relief valve (2). In addition to the pressure relief valve (2), the system includes a check valve (4), a pressure sensor (3), a position switch (10), a first pressure adjustment member (13) for the relief valve, a second pressure adjustment member (12) for the check valve (4), an actuator (16), and a microcontroller (15) with a memory (6) and a display (7). Faults caused by pressure adjustment interactions are prevented by permitting an adjustment of the pressure relief valve only if the check valve is fully open and a pump provides pressure. For this purpose the actuator (16) of the check valve in its normal position prevents an adjustment of the pressure relief valve. Opening the check valve by the actuator permits adjusting the pressure relief valve (2) and the switch (10) operated through the actuator sends a signal to the microcontroller to drive the pump. When the check valve is opened, the pressure is equalized throughout the system, so that adjusting the response pressure of the pressure relief valve automatically adjusts the system pressure to a desired rated pressure.

17 Claims, 2 Drawing Sheets

APPARATUS AND METHOD FOR CONTROLLING A RATED SYSTEM PRESSURE

FIELD OF THE INVENTION

The invention relates to an apparatus and a method for controlling a rated system pressure in a pressure supply system such as a hydraulic system by simultaneously adjusting a pressure relief valve on a pressure generating or input side and operating a switch on the pressure consumption or output side of the pressure supply system.

BACKGROUND INFORMATION

Pressure supply systems such as hydraulic or pneumatic systems are operated by a pressure pump at a rated system pressure. When such systems are used in clamping operations, for example to hold a workpiece in a machine tool, it is often necessary to adjust the system pressure to a given situation requiring a different rated system pressure which may be higher or lower than the initially adjusted rated system pressure. Changing the rated system pressure, however, introduces a relatively large source of error or fault, since at least two elements that influence each other must be adjusted.

Such pressure supply systems, especially hydraulic systems, require a pressure relief valve, which limits the actual pressure to a maximal system pressure and simultaneously determines the safety of the system. Conventionally, a pressure switch governs the pressure generating pump, or rather, a motor driving the pump. The pressure relief valve controls the maximal pressure in the system by bleeding excess pressure fluid to an overflow line when the pressure exceeds a rated pressure. If it becomes necessary to change the system pressure, then the pressure relief valve and the pressure switch must be adjusted relative to each other in their response characteristic. Even minor errors in the adjustment can result in damage to system components or to pressure-driven devices connected to the system, such as workpiece holding clamps. In addition, the pressure switch functions imprecisely in the lower pressure range and with a large hysteresis. Adaptation of the system pressure of such a system to a new rated system pressure thus requires that the operating personnel have a great deal of expertise and experience in making such adjustments. Consequently, adjusting the system pressure can be problematic in many cases.

Prior art teaches mechanically coupling the pressure relief valve and the pressure switch to each other by arranging the valve and the switch on a common shaft. The disadvantage of such an arrangement is that a mechanical adjustment across greater pressure ranges is often inaccurate since the spring forces of the elements, i.e. in the pressure relief valve and in the pressure switch, differ. Different pressures are effective on these two elements because of their different tasks. As a result, differential forces flow into the mechanics, thus making it quite difficult and time-consuming to achieve an exact adjustment.

OBJECTS OF THE INVENTION

In view of the above, it is the aim of the invention to achieve the following objects singly or in combination:
- to provide an apparatus and method for adjusting a rated system pressure in a pressure supply system by adjusting a single pressure adjustment element, whereby an increase or decrease of the rated system pressure shall be possible;
- to provide such an apparatus and method for electronically generating adjustment parameters, derived from a newly adjusted rated system pressure, and for generating control signals derived from the adjustment;
- to define the system response characteristics as a function of the value that is set at the pressure relief valve;
- to provide a pressure responsive feedback control and error recognition capability, as well as to display pressure and/or error values to enable corrective measures; and
- to avoid or overcome the disadvantages of the prior art and to achieve the advantages that a simultaneous adjustment of two elements becomes unnecessary.

The invention further aims to avoid or overcome the disadvantages of the prior art and to achieve additional advantages, as are apparent from the present description.

SUMMARY OF THE INVENTION

The above objects have been achieved in a pressure control system for adjusting a rated system pressure by first adjusting a single pressure adjustment member and enforcing any further required adjustments as follow-up adjustments. The pressure control system comprises a pressure relief valve, a check valve, a pressure sensor, a switch, a first and a second pressure adjustment member, a microcontroller and an actuator for the second adjustment member, wherein an operation of the actuator is linked to permitting an adjustment of the first pressure adjusting member of the pressure relief valve. The pressure relief valve connects a pressure supply line forming an input to a pressure return line. The check valve is connected in the pressure supply line between the input, to which a pump supplies fluid under pressure, and a pressure output, to which pressure users, not shown, are connected. The pressure sensor is arranged in the pressure supply line for sensing the actual pressure in the supply line and provides an actual pressure signal to the microcontroller, which under normal operating conditions sends a pump control signal to a pressure pump motor to initiate pumping, when or if the actual pressure falls below the rated system pressure. Thus, normally in the working mode, the pump does not need to work as long as a rated system pressure set in the microcontroller and the actual system pressure are equal to each other. However, if a new rated system pressure higher than the rated previous system pressure is required, the pump must be enabled or rather its motor must be energized even though pressure equality exists. For this purpose the switch of the invention is normally open but is momentarily closed when the system pressure is to be adjusted to a higher rated system pressure by adjusting the pressure relief valve.

The new rated system pressure is adjusted by adjusting the first pressure adjustment member of the pressure relief valve which changes the response pressure of the pressure relief valve.

However, the pressure relief valve according to the invention can only be adjusted if the check valve is momentarily disabled, that is, opened by its actuator and if the pressure relief valve adjustment member is accessible in response to the open status of the check valve, preferably the fully open check valve. Placing the actuator in a check valve open position simultaneously signifies that the rated system pressure is to be adjusted by closing the switch momentarily in addition to opening the check valve. The closed switch sends an enabling signal to the microcontroller to cause a pump control signal which switches the pump motor ON. With the check valve open equal pressures are present between the pressure generation input and the pressure output of the pressure supply line. Since the actuator is now in the check valve open position, the pressure relief valve can now be adjusted to a new higher or lower rated system pressure. A value representing a higher or lower system pressure is preferably stored in a memory and displayed on a display of the microcontroller for use by the operator when adjusting the pressure relief valve. After the adjustment of the pressure relief valve to the higher or lower rated system pressure, the actuator and thus the second pressure adjustment member and the check valve are returned to the normal position. If the new rated system pressure is higher than before, the check valve does not need an adjustment. Under normal operating conditions the check valve is open as long as a pressure supply pump is running.

The linking between the complete opening of the check valve and the enabling of the adjustment of the pressure relief valve can be accomplished electrically or mechanically. A mechanical link according to the invention is provided by the actuator having such a configuration that it prohibits access to the first pressure adjustment member during normal operation of the hydraulic system. When the actuator is brought into the adjustment position, an opening in the actuator is aligned with the first pressure adjustment member to allow adjustment of the pressure relief valve by turning the first pressure adjustment member.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
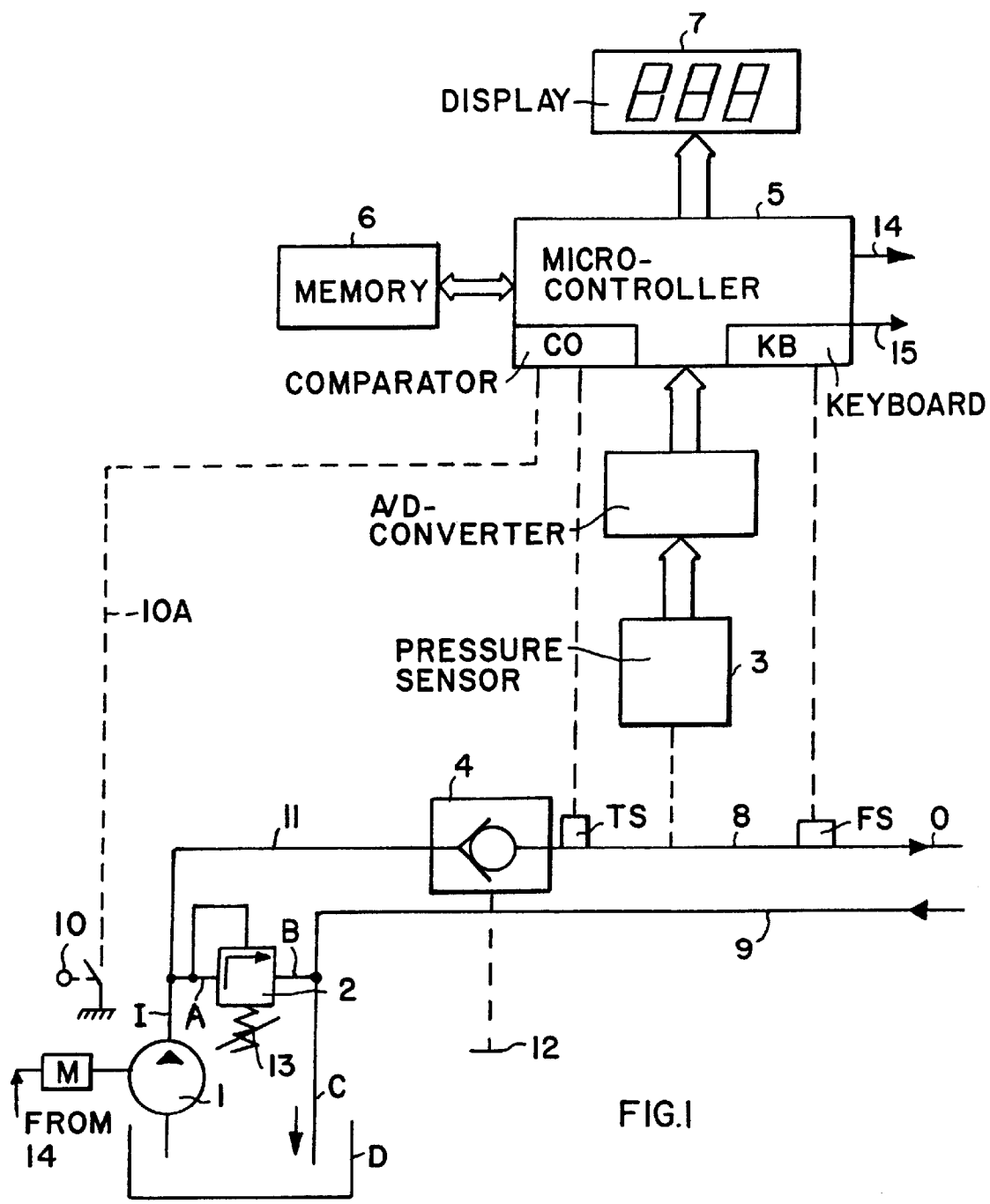
FIG. 1 is a block diagram of the elements of a hydraulic system including the pressure control system of the invention.

FIG. 1 is a block diagram that shows a pump 1 for generating the desired pressure in a pressure supply line or duct, which includes a pressure input I formed by a line 11 and a pressure output O formed by a line 8. The pressure output line 8 leads to pressure consumer elements, i.e. pressure-operated clamps or other devices that function dependent upon an adequate pressure supply. The pressure fluid returns to a reservoir D of the pump 1 through a return flow line 9. A pressure relief valve 2 controls the system pressure by bleeding excess pressure fluid into an overflow or by-pass line A, B, C which returns excess fluid to the reservoir D. A check valve 4 that statically seals the pressure input I from the pressure output O is provided between the pressure input line 11 and the pressure output line 8. According to the invention check valve 4 must be open, preferably fully open, as a first condition of any adjustment of the pressure relief valve 2 to a required rated system pressure in the pressure supply line 11, 8. As a second condition, any adjustment of the pressure relief valve 2 must be possible only if the check valve 4 is open. If the pressure relief valve is to be adjusted to a higher rated system pressure the pump 1 must be running as a third condition. These three conditions are satisfied by an actuator 16 for opening the check valve 4 and a switch 10 for signifying an intended rated system pressure adjustment in response to an opening of the check valve 4 as will be described below.

FIG. 1 also shows a microcontroller 5 as the main control element in the system. The microcontroller 5 maintains and monitors the rated system pressure by closed loop control during normal operation of the system. The microcontroller 5 receives actual system pressure information from a pressure sensor 3. The pressure sensor 3 senses the actual system pressure on the pressure output side when the check valve 4 is closed. However, when the check valve 4 is open, the pressure sensor 3 senses the equalized system pressure in the pressure supply lines 8 and 11. The microcontroller 5 further comprises a first output terminal 14 for providing a feedback control signal for operating a pump motor M of the pump 1 and a second output terminal 15 for providing system status signals to external control devices for making corrections in the pressure control system. Under normal operating conditions the pump needs to run only if the actual system pressure as sensed by the sensor 3 falls below a rated system pressure stored in a memory 6.

The microcontroller 5 includes a comparator CO for comparing actual and rated system pressures. The comparator CO compares an actual pressure signal received from the pressure sensor 3 preferably through an A/D converter, with the rated system pressure entered through a keyboard KB and stored in the memory 6. If the comparator CO determines that the actual system pressure is below the rated system pressure, the feedback control signal is supplied to the pump motor M of the pump 1 to initiate pumping.

A conductor 10A connects an output of the switch 10 to an input of the microcontroller 5. In the example embodiment, the switch 10 is a normally-open magnetically-operated reed switch that, when closed, sends a signal to the microcontroller 5 to provide a pump control signal at the output 14, which will initiate pumping even if no pumping is needed according to the comparator output. This extra pumping satisfies the above mentioned third condition which will be described in more detail below. The switch 10 is closed momentarily through the movement of the actuator 16 when the rated system pressure is to be adjusted to a higher value by adjusting the pressure relief valve 2 at a time when the pump is not yet running because the current rated and actual pressures are equal. The signal from the switch 10 overrides the pump OFF status provided at this time by the comparator CO. Thus, a pump ON condition is enforced at least during an upward adjustment of the rated system pressure. The pump 1 may be switched OFF when the system pressure is to be adjusted downward, or may continue to pump fluid, in which case, the pressure relief valve 2 will cause excess pressure fluid to flow through the by-pass line A, B, C into the reservoir D.

Other sensors and measuring devices, such as a temperature sensor TS and/or a flow sensor FS, may also be included in the pressure control system to provide the microcontroller 5 with additional information to be used for error recognition and correction by generating respective signals at the output 15. For example, flow sensors FS or temperature sensors TS may be installed in any one of the pressure supply lines 8, 11 and/or the return flow line 9 and have outputs that are connected to respective inputs of the microcontroller 5. Upon receiving input signals from such sensors, the microcontroller 5 processes these signals to generate respective system status signals for the output terminal 15, to which external control or warning devices, not shown, may be connected.

An optical display panel 7, shown in FIG. 1 is connected to the microcontroller 5 by a data bus. Various informations can be displayed for the operator on the display 7, such as the actual system pressure, the new rated system pressure during an adjustment operation, as well as other information, e.g. temperatures, flow rates, and the like. The memory 6 is preferably a rewritable, non-volatile memory and is part of the microcontroller 5. Each information stored in this memory 6 remains there until it is overwritten by new information. Preferably, rated system pressure values are entered into the memory 6 through the keyboard KB as mentioned above.

Figure 2:
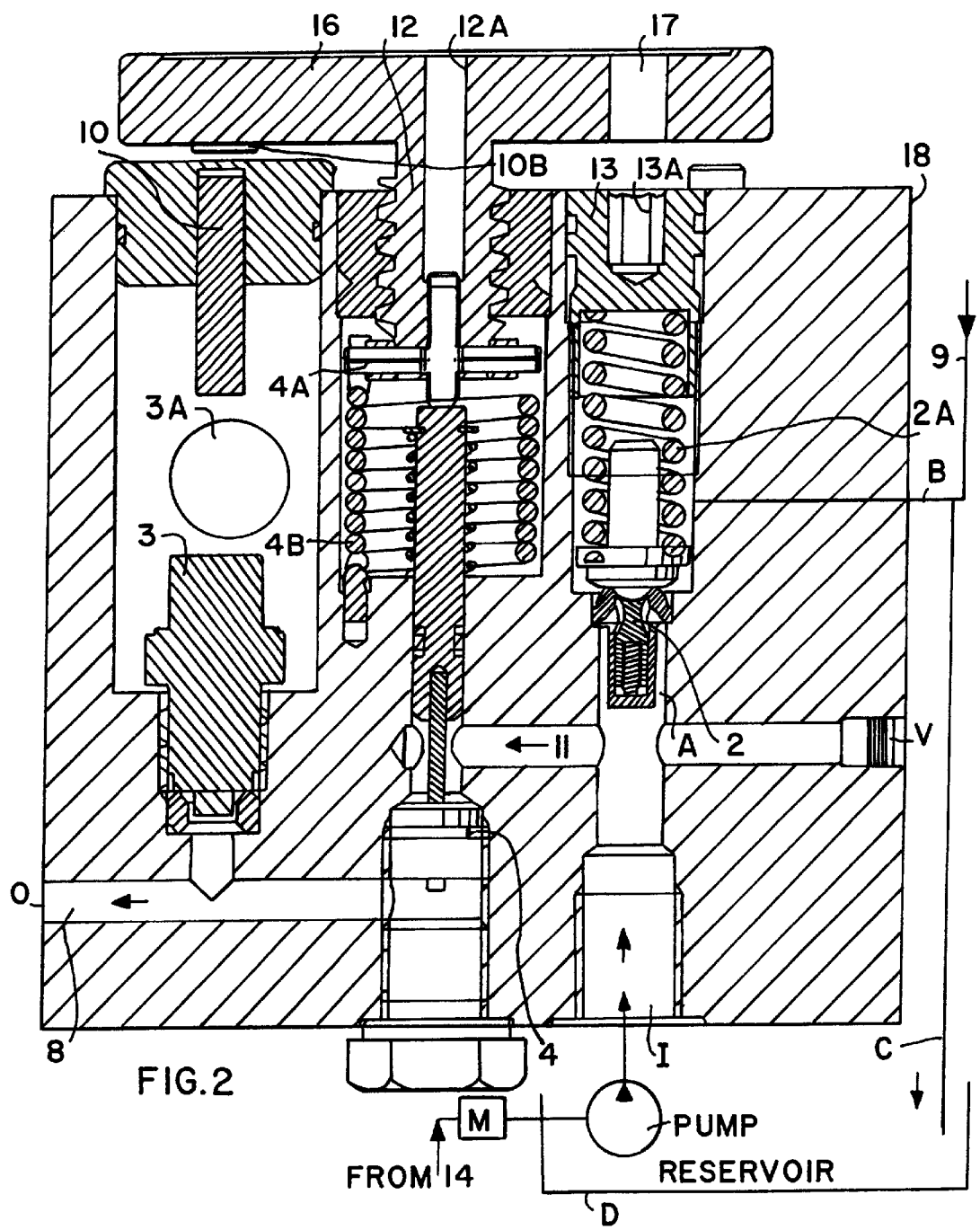
FIG. 2 is a cross-sectional view through the present pressure control system with two valves and a pressure sensor in a common housing.

FIG. 2 shows a cross-sectional view of an example embodiment of the pressure control system, or so-called aggregate, of the invention. All system elements form a single unit arranged in a common housing 18. The housing 18 includes the pressure supply lines or ducts 8, 11, an inlet port I connected to the pressure port of the pump 1, and an outlet O connectable to pressure users, not shown. The housing further includes a vent V, a cavity enclosing the pressure relief valve 2, a further cavity enclosing the check valve 4, and a third cavity for the pressure sensor 3. The third cavity includes a lead through 3A for electrical conductors.

A first pressure adjustment member 13 for adjusting the response pressure of the pressure relief valve 2 is positioned in the housing above the pressure relief valve 2. The pressure relief valve 2 can be adjusted to a rated system pressure by adjusting this first pressure adjustment member 13, however only if the above mentioned three conditions are satisfied by the actuator 16 and the switch 10.

A second adjustment member 12 for opening the check valve 4 is connected to the actuator 16, which is a knurled disk, for example. The actuator 16 has a configuration which prevents access to the first adjustment member 13 of the pressure relief valve 2 when the check valve 4 is in its normal operating state. The actuator 16 provides access to the member 13 when the check valve 4 is brought into the fully open position by the actuator 16. For this purpose the actuator 16 is provided with an opening 17 such as a through-bore that aligns precisely with the first pressure adjustment member 13 only when the actuator 16 is in the adjustment position, whereby the check valve has been opened to satisfy the first condition (check valve open) and the second condition (pressure relief valve accessible) for permitting an adjustment operation by turning the first adjustment member 13. It is now possible to insert a tool through the opening 17 into a cavity 13A of the first pressure adjustment member 13, thereby adjusting the response pressure of the pressure relief valve 2 to a new, rated system pressure. However, the third condition (pump running) must also be satisfied.

As mentioned, an adjustment of a new higher rated system pressure can take place only when a signal is sent to the microcontroller 5 that the rated system pressure is to be raised. For this purpose the actuator 16 by its movement that opens the check valve 4, closes the switch 10 momentarily. The respective signal tells the microcontroller 5 that the pump motor M is to be energized even though the comparator CO recognizes that the currently measured actual pressure equals the current rated pressure in the memory 6. In the example embodiment, the switch 10 is a magnetically-operated reed switch and a magnet 10B arranged on the actuator 16 operates the switch 10 when the actuator 16 is moved to open the check valve 4. However, any type of position sensing switches can be used, such as a proximity switch, a piezo switch or the like capable of sensing a movement of the actuator 16.

Adjusting the first pressure adjustment member 13 with a tool inserted into the cavity 13A through the opening 17 sets the response pressure at the pressure relief valve 2 to the desired value which is measured or sensed by the sensor 3 and indicated by the display 7. The operator observes the display and stops turning the member 13 when the new rated pressure is displayed. The actuator 16 is then returned to its home position, thereby preventing again access to the first adjustment member 13 and returning the check valve 4 to its normal operating condition.

The combination of the pressure relief valve 2 and the first pressure adjustment member 13 makes it possible to change the system pressure manually as described. This manual solution can be replaced by an electrically actuatable unit. In this case an electric motor is connected to the second pressure adjustment member 12, in place of the actuator 16, to open the check valve 4 and provide for an adjustment of the pressure relief valve 2 by a rotation of the first pressure adjustment member 13 coupled to such motor drive.

When the adjustment of the pressure relief valve to a new rated system pressure is completed as described above and the new rated system pressure value is stored in the memory 6 normal operation can resume. The check valve 4 can again function for its purpose of blocking any backflow provided the new rated system pressure is higher than the previous rated system pressure. However, when the new rated system pressure is lower, the check valve may need a corresponding downward adjustment. This adjustment of the check valve 4 can be accomplished by inserting a tool into a cavity 12A to turn a spring bias adjustment member 4A of the check valve 4 until the biasing force of the spring 4B accommodates the new lower rated system pressure.

As noted above, the pressures at the pressure relief valve 2 and the pressure sensor 3 are equalized during the adjustment operation because the check valve 4 is open. Consequently, the stored new rated system pressure corresponds to the adjustment value at the pressure relief valve 2. The microcontroller 5 can now, with the aid of the rated and actual pressure values, set the switching points for the pump 1 and the release of switching elements. Thus, any change at the pressure relief valve 2 is reflected in the pressure in the pressure supply lines 11, 8 specifically in the pump connected line section 11 and in the output line section 8. Consequently, all switching points are defined and a dependency is created among all switching points, as well as among the couplings of the pressure output line 8, the return flow line 9, and the pressure input line 11.

When the actuator 16 is returned to the home position, the check valve 4 is closed again and the pressure output line 8 is decoupled from the pressure input line 11. Should the actual pressure in the pressure output line 8 drop below the rated system pressure, for any reason, the pressure drop will be signaled to the microcontroller 5 by the pressure sensor 3. The microcontroller 5 will then immediately send a control signal through the terminal 14 to the motor M to operate pump 1 for maintaining the new rated system pressure.

The pressure control system according to the invention also provides an error or fault recognition capability, depending on the various sensors TS, FS that are installed in the system and connected to the microcontroller 5. The microcontroller 5 can send out system status signals 15 to external control or warning devices (not shown) when an error has been detected. These external devices can serve to display information or give visual or acoustic warnings, or may also intervene in the present system, which is preferably, but not necessarily a hydraulic system.

Although the invention has been described with reference to specific example embodiment, it will be appreciated that it is intended to cover all modifications and equivalents within the scope of the appended claims. It should also be understood that the present disclosure includes all possible combinations of any individual features recited in any of the appended claims.

What is claimed is:

1. A pressure control system for maintaining a rated system pressure at a pressure input (I) and at a pressure output (O), said pressure control system comprising a pressure supply line (11, 8) for feeding fluid under pressure from said pressure input (I) to said pressure output (O), a pressure return line (9) for returning fluid to a pressure pump (1), a pressure relief valve (2) for connecting said pressure supply line (11) to said pressure return line (9) in response to an excess pressure in said pressure supply line (11, 8), a first pressure adjustment member (13) for adjusting a response pressure of said pressure relief valve (2), a check valve (4) connected in said pressure supply line (11, 8) between said input (I) and said output (O), a second pressure adjustment member (12) for adjusting a response pressure of said check valve (4), a pressure sensor (3) arranged for sensing an actual pressure in said pressure supply line to provide a respective actual pressure signal for operating said pump, a microcontroller (5) having an input connected to receive an output signal from said pressure sensor (3) for generating in said microcontroller (5) a pump control signal, a switch (10) for enabling said pump control signal when said pressure relief valve is to be adjusted to a higher or lower system pressure, a conductor (10A) connecting said switch (10) to said microcontroller (5), and means (16, 17) cooperating with said first and second pressure adjustment members for permitting an adjustment of said pressure relief valve (2) through said first pressure adjustment member (13) only if said second pressure adjustment member (12) is in a position signifying that said check valve (4) is open and said pump (1) is enabled through a signal from said switch (10).

2. The pressure control system of claim 1, wherein said cooperating means (16, 17) comprise an actuator (16) for operating said second pressure adjustment member (12) to open said check valve, said actuator (16) having a configuration normally covering access to said first pressure adjustment member (13) for preventing an adjustment of said first pressure adjustment member (13) under normal working conditions, said actuator (16) comprising an opening (17) so positioned in said actuator (16) that an alignment of said opening (17) with said first pressure adjustment member (13) is enforced when said second pressure adjustment member (12) has opened said check valve (4) in response to an operation of said actuator (16), whereby said pressure relief valve (2) can be adjusted to a rated pressure by said first pressure adjustment member (13) only when said check valve (4) is open and said switch has been activated by the operation of said actuator (16).

3. The pressure control system of claim 2, wherein said switch (10) is ineffective during said normal working conditions of said pump (1) under which the pump is driven only in response to a control signal (14) generated by said microcontroller (5) in response to a measured actual pressure signal from said pressure sensor (3), and wherein said switch (10) provides a pump enabling signal when said actuator begins to move and at the latest when said opening (17) is in alignment with said first pressure adjustment member (13) for enabling a pumping operation when said alignment exists for adjusting said pressure relief valve (2) to a higher rated system pressure.

4. The pressure control system of claim 1, wherein said microcontroller (5) further comprises a first output terminal (14) for providing a pump control signal for operating said pump (1) under normal operating conditions, and a second output terminal (15) for providing system status signals for making corrections in said pressure control system.

5. The pressure control system of claim 1, wherein said microcontroller (5) further comprises a memory (6) for storing any currently adjusted rated system pressure, and a display (7) for displaying any actual pressure sensed in said pressure control system by said sensor (3).

6. The pressure control system of claim 1, wherein said microcontroller (5) comprises a memory (6) for storing at least one rated system pressure, a comparator (CO) for comparing a rated system pressure with an actual system pressure as sensed by said sensor (3) to provide a pump control feedback signal for maintaining said actual system pressure substantially equal to said rated system pressure during normal working conditions.

7. The pressure control system of claim 1, wherein said switch (10) is a reed switch responsive to magnetic action, and wherein said actuator (16) comprises a magnet (10B) for operating said reed switch (10).

8. A pressure control valve system comprising a check valve (4) responsive to a rated system pressure for keeping said check valve open under normal operating conditions as long as a pump is running, a pressure relief valve (2) responsive to an excess pressure exceeding said rated system pressure for detouring fluid under excess pressure to maintain said rated system pressure, a first pressure adjustment member (13) for adjusting said pressure relief valve (2), a second pressure adjustment member (12) for opening said check valve (4), an actuator (16) for operating said second pressure adjustment member (12), said actuator (16) having a configuration for preventing an adjusting of said first pressure adjustment member (13) under normal working conditions by preventing access to said first pressure adjustment member (13), said actuator (16) comprising an opening (17) so positioned in said actuator (16) that an alignment of said opening (17) with said first pressure adjustment member (13) is enforced when said second pressure adjustment member (12) has opened said check valve (4) by an operation of said actuator (16), whereby said pressure relief valve (2) can be adjusted to a rated system pressure by said first pressure adjustment member (13) only when said check valve (4) is open.

9. The valve system of claim 8, further comprising a switch (10) responsive to a movement of said actuator (16) for generating a pump enabling signal when said actuator (16) is moved to or in a position permitting access to said first pressure adjustment member (13).

10. The valve system of claim 9, wherein said switch (10) is a switch responsive to magnetic action, and wherein said actuator (16) comprises a magnet (10B) for operating said switch (10).

11. The valve system of claim 8, further comprising a pressure pump (1) responsive to said switch (10) so that pump (1) is enabled (ON) when there is access to said first pressure adjustment member (13), and wherein said pump is operable under normal operating conditions without said switch (10), to maintain a rated system pressure.

12. A method for adjusting a rated system pressure in a pressurized fluid supply system including a pump, by means of a pressure relief valve (2) and a check valve (4), said method comprising the following steps:

(a) disabling an adjustment of said pressure relief valve (2) when said check valve (4) is in a normal operating position,
(b) opening said check valve (4), simultaneously enabling an operation of said pump (1) and an adjustment of said pressure relief valve (2) in response to said opening of said check valve (4),
(c) adjusting said pressure relief valve (2) to said rated system pressure, and
(d) returning said check valve (4) to its normal operating position, simultaneously enabling said pump (1) for normal operation and again disabling an adjustment of said pressure relief valve (2) in response to said returning of said check valve into its normal operating position.

13. The method of claim 12, further comprising sensing a position of said check valve (4) to provide a check valve position signal, sensing an actual pressure in said system, and controlling said pump (1) in response to said check valve position signal and in response to said sensed actual pressure in said system when said check valve is open.

14. The method of claim 12, further comprising generating a pump activating feedback signal in response to a sensed actual pressure falling below a stored rated system pressure.

15. The method of claim 12, further comprising storing a rated system pressure, sensing an actual system pressure, comparing said rated system pressure with said actual system pressure for generating a pump control signal for controlling said pump in response to a difference between said actual system pressure and said rated system pressure.

16. The method of claim 15, further comprising generating said pump control signal for driving said pump when said difference indicates that said actual system pressure is below said rated system pressure.

17. The pressure control valve system of claim 1, further comprising an analog-to-digital converter connected between an output of said pressure sensor (3) and said microcontroller (5).

* * * * *